US010922473B1

(12) United States Patent
Cogan

(10) Patent No.: US 10,922,473 B1
(45) Date of Patent: Feb. 16, 2021

(54) SYSTEM AND METHOD FOR DISTRIBUTED DESIGN OF A VARIABLE DATA PUBLICATION

(71) Applicant: PTI Marketing Technologies Inc., Solana Beach, CA (US)

(72) Inventor: Douglas Neal Cogan, Brookfield, IL (US)

(73) Assignee: PTI Marketing Technologies Inc., Solana Beach, CA (US)

( * ) Notice: Subject to any disclaimer, the term of this patent is extended or adjusted under 35 U.S.C. 154(b) by 366 days.

(21) Appl. No.: 14/746,240

(22) Filed: Jun. 22, 2015

Related U.S. Application Data

(63) Continuation of application No. 11/200,861, filed on Aug. 10, 2005, now Pat. No. 9,063,921.

(51) Int. Cl.
*G06F 40/103* (2020.01)
*G06F 40/14* (2020.01)
*G06F 40/186* (2020.01)

(52) U.S. Cl.
CPC ............ *G06F 40/103* (2020.01); *G06F 40/14* (2020.01); *G06F 40/186* (2020.01)

(58) Field of Classification Search
CPC .... G06F 17/211; G06F 17/218; G06F 17/243; G06F 16/20; G06F 16/30; G06F 3/04; G06F 40/00
See application file for complete search history.

(56) References Cited

U.S. PATENT DOCUMENTS

| 4,839,829 A | 6/1989 | Freedman |
| 4,850,028 A | 7/1989 | Kawamura et al. |
| 5,367,619 A | 11/1994 | Dipaolo et al. |
| 5,586,241 A | 12/1996 | Bauermeister et al. |
| 5,694,551 A | 12/1997 | Doyle et al. |
| 5,745,712 A | 4/1998 | Turpin et al. |
| 5,758,126 A | 5/1998 | Daniels et al. |
| 5,758,327 A | 5/1998 | Gardner et al. |
| 5,765,138 A | 6/1998 | Aycock et al. |

(Continued)

FOREIGN PATENT DOCUMENTS

| EP | 0778535 | 6/1997 |
| EP | 1026876 | 8/2000 |

(Continued)

OTHER PUBLICATIONS

Office Action for U.S. Appl. No. 11/200,861, dated Oct. 2, 2009.

(Continued)

*Primary Examiner* — Sanchita Roy
(74) *Attorney, Agent, or Firm* — Cooley LLP

(57) ABSTRACT

A method for collecting information useable in creating a Web form through which data for variable portions of a printable document is entered is disclosed herein. The method includes receiving layout information relating to a template document having one or more fields. The method further includes receiving form definition information relating to a design of a Web form for the template document, wherein the Web form includes one or more entries corresponding to the one or more fields. The layout information and the form definition information are then collected for storage within a file, and the file is transmitted to a server capable of generating the Web form using the file.

26 Claims, 15 Drawing Sheets

(56) References Cited

U.S. PATENT DOCUMENTS

| | | |
|---|---|---|
| 5,842,178 A | 11/1998 | Giovannoli |
| 5,911,141 A | 6/1999 | Kelley et al. |
| 5,911,143 A | 6/1999 | Deinhart et al. |
| 5,963,939 A | 10/1999 | McCann et al. |
| 6,043,826 A | 3/2000 | Manning |
| 6,055,522 A | 4/2000 | Krishna et al. |
| 6,067,548 A | 5/2000 | Cheng |
| 6,092,050 A | 7/2000 | Lungren et al. |
| 6,161,146 A | 12/2000 | Kley et al. |
| 6,182,078 B1 | 1/2001 | Whitmyer, Jr. |
| 6,199,079 B1 | 3/2001 | Gupta et al. |
| 6,205,452 B1 | 3/2001 | Warmus et al. |
| 6,226,656 B1 | 5/2001 | Zawadzki et al. |
| 6,236,409 B1 | 5/2001 | Hartman |
| 6,308,164 B1 | 10/2001 | Nummelin et al. |
| 6,327,599 B1 | 12/2001 | Warmus et al. |
| 6,356,268 B1 | 3/2002 | Beaman et al. |
| 6,449,053 B2 | 9/2002 | Bando |
| 6,460,072 B1 | 10/2002 | Arnold et al. |
| 6,583,887 B1 | 6/2003 | Clouthier et al. |
| 6,615,188 B1 | 9/2003 | Breen et al. |
| 6,615,234 B1 * | 9/2003 | Adamske ............... H04L 29/06 709/200 |
| 6,826,727 B1 * | 11/2004 | Mohr ................... G06F 17/211 382/180 |
| 6,832,226 B1 | 12/2004 | Parker |
| 6,844,940 B2 | 1/2005 | Warmus et al. |
| 6,919,967 B1 | 7/2005 | Pentecost et al. |
| 6,952,801 B2 | 10/2005 | Warmus et al. |
| 7,117,165 B1 | 10/2006 | Adams et al. |
| 7,117,504 B2 | 10/2006 | Smith et al. |
| 7,268,912 B2 | 9/2007 | Murata |
| 7,300,044 B2 | 11/2007 | Stemmle |
| 7,375,842 B2 | 5/2008 | Kloosterman et al. |
| 7,434,160 B2 * | 10/2008 | Peiro ................... G06F 17/2247 358/1.9 |
| 7,672,010 B2 | 3/2010 | Hirtenreiter et al. |
| 9,063,921 B1 * | 6/2015 | Cogan ................... G06F 16/958 |
| 9,098,482 B2 * | 8/2015 | Bradley ............... G06F 17/243 |
| 9,262,384 B2 * | 2/2016 | Davis .................... G06F 16/93 |
| 2001/0005831 A1 | 6/2001 | Lewin et al. |
| 2002/0052807 A1 * | 5/2002 | Han ..................... G06Q 30/06 705/26.1 |
| 2002/0069157 A1 * | 6/2002 | Jordan ................. G06Q 30/08 705/37 |
| 2002/0087702 A1 | 7/2002 | Mori |
| 2002/0097418 A1 | 7/2002 | Chang et al. |
| 2002/0099738 A1 * | 7/2002 | Grant ................... G06F 9/4443 715/234 |
| 2002/0103826 A1 * | 8/2002 | Kriho .................... G06F 16/93 715/225 |
| 2002/0111963 A1 * | 8/2002 | Gebert ................. G06F 17/211 715/234 |
| 2002/0120628 A1 * | 8/2002 | Hitchcock ............ G06F 17/243 |
| 2002/0138591 A1 * | 9/2002 | Reynolds .............. G06F 17/24 709/218 |
| 2002/0152234 A1 * | 10/2002 | Estrada ................ G06F 17/243 715/201 |
| 2002/0194219 A1 * | 12/2002 | Bradley ............... G06F 17/243 715/223 |
| 2003/0189726 A1 | 10/2003 | Kloosterman et al. |
| 2004/0073485 A1 * | 4/2004 | Liu ....................... G06Q 30/02 705/14.27 |
| 2004/0205609 A1 | 10/2004 | Milton et al. |
| 2004/0207876 A1 | 10/2004 | Aschenbrenner |
| 2004/0246254 A1 | 12/2004 | Opstad et al. |
| 2005/0048458 A1 * | 3/2005 | Collins ................... G09B 7/02 434/323 |
| 2005/0086221 A1 | 4/2005 | Parker |
| 2005/0200861 A1 * | 9/2005 | Kubota ............... B41J 11/0065 358/1.5 |
| 2005/0240971 A1 | 10/2005 | Koppich et al. |
| 2006/0279769 A1 * | 12/2006 | Ludwig ................. G06F 21/608 358/1.15 |
| 2006/0279771 A1 * | 12/2006 | Ludwig ..................... G06F 3/12 358/1.15 |
| 2008/0098291 A1 * | 4/2008 | Bradley ............... G06F 17/243 715/223 |
| 2008/0259392 A1 | 10/2008 | Tokumoto |
| 2008/0267491 A1 | 10/2008 | Matsui |
| 2009/0051947 A1 | 2/2009 | Kuroshima |
| 2010/0257446 A1 | 10/2010 | Woolfe et al. |
| 2011/0026042 A1 | 2/2011 | Cogan et al. |
| 2011/0075196 A1 | 3/2011 | Cogan |

FOREIGN PATENT DOCUMENTS

| | | |
|---|---|---|
| EP | 1031916 | 8/2000 |
| EP | 1471460 | 10/2004 |
| GB | 2324896 | 11/1998 |
| JP | 2005-022298 | 1/2005 |
| WO | WO 97/27555 | 7/1997 |
| WO | WO 99/19830 | 4/1999 |

OTHER PUBLICATIONS

Office Action for U.S. Appl. No. 11/200,861, dated Jun. 21, 2010.
Office Action for U.S. Appl. No. 11/200,861, dated Jun. 8, 2011.
Office Action for U.S. Appl. No. 11/200,861, dated Jan. 19, 2012.
Office Action for U.S. Appl. No. 11/200,861, dated Aug. 30, 2012.
Office Action for U.S. Appl. No. 11/200,861, dated Jun. 3, 2013.
Office Action for U.S. Appl. No. 12/571,387, dated Nov. 22, 2011.
Office Action for U.S. Appl. No. 12/571,387, dated Jul. 24, 2012.
Office Action for U.S. Appl. No. 12/571,387, dated May 2, 2013.
International Search Report and Written Opinion for International Application No. PCT/US2010/050302, dated Dec. 16, 2010.
Office Action for U.S. Appl. No. 12/534,717, dated Jan. 30, 2013, 13 pages.
International Search Report and Written Opinion for International Application No. PCT/US2010/044298, dated Oct. 20, 2010.
Aberdeen Group Review, "Process-centric applications drive the bottom line: NovaSoft marries the web and the business process," NovaSoft Press Area, Aberdeen Group, Inc., Boston, Massachusettes, (1997) [Retrieved from the Internet Jan. 18, 1999), 7 pages.
Ciancarini, P. et al., "A multi-agent process centered environment integrated with the WWW," Proceedings—The Workshop on Enabling Technologies: Infrastructure For Collaborative Enterprises, US, IEEE Computer Society Press, Los Alamitos, CA, Jan. 1, 1997, pp. 113-120.
Feibus, A., "RequisitePro 3.0 manages requirements, documents," Informationweek, No. 677, pp. 18A-22A, Apr. 13, 1998.
Marotta, M. E., "Detroit: Contracting for Quality," Industrial Robot, 20(4):23-25 (1993).
Matrix One, Inc., "Matrix," (1997), [Retrieved from the Internet May 8, 1999], 7 pages.

* cited by examiner

SYSTEM AND METHOD FOR DISTRIBUTED DESIGN OF A VARIABLE DATA PUBLICATION

RELATED APPLICATION

This application is a continuation of U.S. patent application Ser. No. 11/200,861, entitled "System and Method for Distributed Design of a Variable Data Publication", filed Aug. 10, 2005, which is incorporated herein by reference in its entirety.

FIELD OF THE INVENTION

The present invention relates to methods of creating variable data publications. More particularly, the invention relates to a system and method for distributed design of a variable data publication which involves integrated development of a publication template and a Web-based form through which personalization or customization information for the publication may be entered.

BACKGROUND OF THE INVENTION

Programs have been created for use designing and otherwise defining the layout of documents and other publications. Certain of these programs are utilized within distributed computing environments, and allow definition of a template for a publication. The template may be interactively developed by a designer and will often specify the collections of text and shape elements defining the pages of the publication. For example, the attributes of the text elements which may be defined by the template may include, for example, font, size and color. In certain systems the template is designed to accommodate "variable data" or "variable content", which means that users of the template are permitted to insert individualized content into some or all of the text and shape elements of the template. In this way a template file functions to specify the manner in which the pages of a publication are to be generated in response to variable content provided by a user.

In certain systems the variable content or other personalized data may be sourced by a remote database in communication via the Internet with a "publishing" server configured to generate variable data publications using predefined templates. For example, in order to create a mass mailing the personalized data may be received by the publishing server one record at a time from the remote database. In response, the publishing server generates a series of personalized documents for mailing to a set of recipients. Alternatively, the variable content may be entered by a user into an HTML form generated by the publishing server and displayed upon the user's client computer (e.g., in order to create a business card). In either case the variable content may be stored by the publishing server as a delimited data file, such as a tabbed-delimited file or a comma-delimited ASCII file. This data file may then be passed to a composition engine or the like executed by the publishing server, which produces a corresponding customized document for the user.

In order to facilitate variable data document creation, the assignee of the present invention has developed an Internet-based platform to enable a designer to create a shell or template document which another person (e.g., a print buyer) may customize, preview and order copies for printing. Once the designer has uploaded the template document to the Internet-based platform, the designer is given the opportunity to specify which information should be provided by a user (i.e., the print buyer) via an HTML form prior to ordering a one or more copies of the resulting customized document. The Internet-based platform then dynamically builds the HTML form through which the user may enter the requisite variable data content. However, this approach requires the template designer to access the Web-based platform after the template has been uploaded in order to provide information used in creating the HTML form, and considerable effort is required to configure the Web-based platform to create the HTML form on the basis of the completed template. Moreover, this approach does not permit the template designer to specify details of the structure, organization or "look and feel" of the HTML form presented to the user.

SUMMARY OF THE INVENTION

In summary, one aspect of the invention relates to a method for generating a printable document file. The method includes receiving layout information relating to a template document having one or more fields. The method further includes receiving form definition information relating to a design of a Web form for the template document wherein the Web form includes one or more entries corresponding to the one or more fields. The Web form is then generated based upon the form definition information, and field content data is received for each of the one or more entries of the Web form. The printable document file is then composed using the template document and the field data.

The present invention also relates to a method for collecting information useable in creating a Web form through which data for variable portions of a printable document is entered. The method includes receiving layout information relating to a template document having one or more fields. The method further includes receiving form definition information relating to a design of a Web form for the template document wherein the Web form includes one or more entries corresponding to the one or more fields. The layout information and the form definition information are then collected for storage within a file, and the file is transmitted to a server.

In another aspect the present invention pertains to a method for designing a Web form through which data corresponding to variable portions of a printable document may be entered. The method includes generating a list of the fields of a template document used in creating the printable document. The method further includes receiving indications of which of the fields are required to be represented within the Web form, thereby defining a set of required form fields. An indication is also received of the data type of at least one of the required form fields. In addition, the method includes receiving character information defining a prompt to be displayed by the Web form in association with display of the at least one of the required form fields.

Another aspect of the present invention relates to a method for generating a printable document file. The method includes receiving, over a first network connection, a document design file containing layout information relating to a template document and form definition information relating to the design of a Web form. The method further includes transmitting, over a second network connection, instructions relating to display of the Web form. In addition, the method includes receiving, over the second network connection, field content information. The printable document file is then composed using the template document and the field information.

The present invention also pertains to a machine-readable medium having instructions stored thereon for execution by a processor to perform a method. In exemplary embodiments the method contemplates receiving layout information relating to a template document having one or more fields. The method further includes receiving form definition information relating to the design of a Web form for the template document wherein the Web form includes one or more entries corresponding to the one or more fields. The Web form is then generated based upon the form definition information and field data is received for each entry of the Web form. Once this has occurred a printable document file is composed using the template document and the field data.

In yet another aspect the present invention relates to a machine-readable medium having instructions stored thereon for execution by a processor to perform a method. In exemplary embodiments the method contemplates receiving, over a first network connection, a document design file containing layout information relating to a template document and form definition information relating to the design of a Web form. The method further includes transmitting, over a second network connection, instructions relating to display of the Web form. In addition, the method includes receiving, over the second network connection, field content information. The printable document file is then composed using the template document and the field information.

BRIEF DESCRIPTION OF THE DRAWINGS

For a better understanding of the nature of the features of the invention, reference should be made to the following detailed description taken in conjunction with the accompanying drawings, in which:

FIGS. 10A-10F show exemplary user interfaces presented to a designer of a Web form through which information defining particular types of fields of the form may be entered.

DETAILED DESCRIPTION OF THE INVENTION

System Overview

Figure 1:
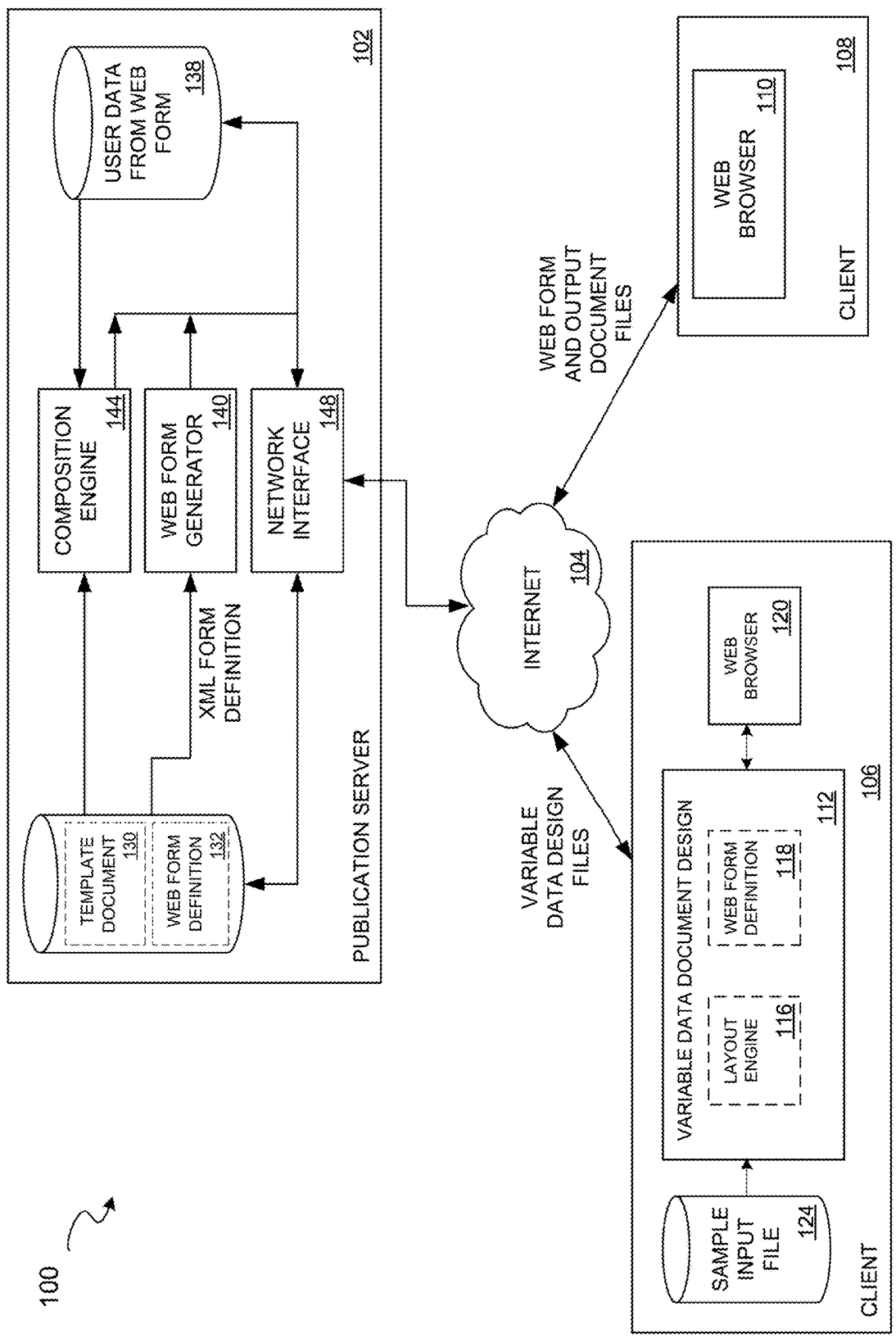
FIG. 1 illustrates an electronic publishing system configured to enable distributed design of a variable data document in accordance with the invention.

Referring to FIG. 1, there is illustrated an electronic publishing system 100 configured to enable distributed design of a variable data document in accordance with the invention. The publishing system 100 includes a publication server 102, which is a Web server capable of communicating with other computers over the Internet 104 in manner known to those skilled in the art. In particular, the publication server communicates with a designer client 106 and a user client 108 in order to effect distributed design of variable data documents. As is described hereinafter, the designer client 106 operates to generate composite variable data design files. In the exemplary embodiment each such file includes a variable data template document and the definition of a Web collect form used in creating a data entry interface rendered via a Web browser 110 of the user client 108. Through this data entry interface a user of client 108 (e.g., a customer of the operator of the system 100) provides customization or other personalization data used by the publication server 102 in creating a customized document based upon the variable data template document received from the designer client 106.

The designer client 106 executes a variable data document design program 112 operative to generate variable data design files in response to input provided by a user of the designer client 106 (e.g., a publication designer). As shown, the variable data document design program 112 is structured to include a layout engine 116 and a Web form definition module 118. The layout engine 116 is configured to generate a variable data document template in response to layout and formatting instructions received from the user of the client computer 106. Although the layout engine 116 may be implemented by those skilled in the relevant art in a number of different ways, in the exemplary embodiment the variable data document template is generated by a layout portion of the DL Formatter® DL-10 software program available from Printable Technologies, Inc. of Solana Beach, Calif. This software program is capable of effecting the functionality of the variable data document design program 112 in the manner described herein.

Figure 2:
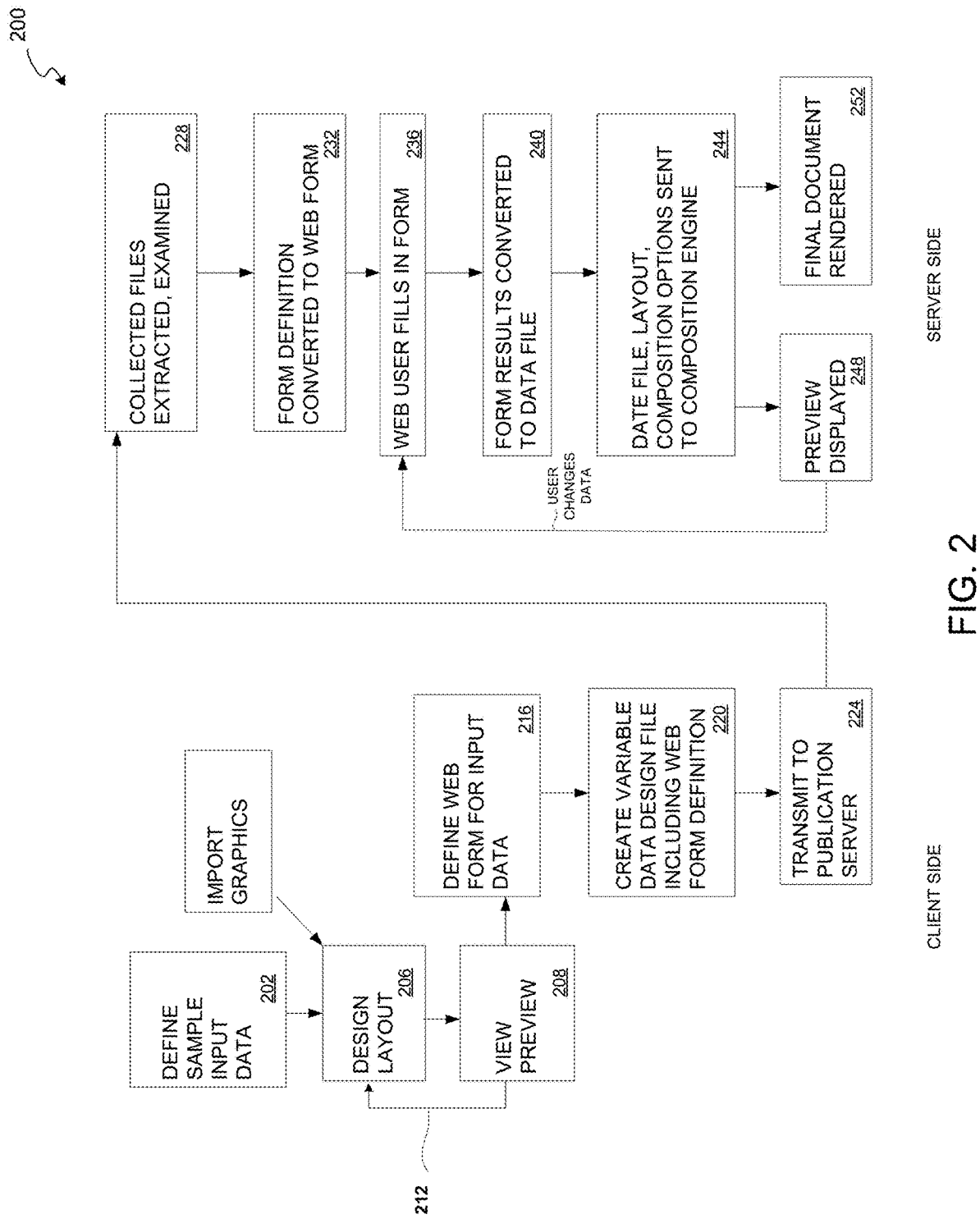
FIG. 2 is a flowchart providing an overview of the operation of the electronic publishing system of FIG. 1.

Attention is further directed to FIG. 2, which is a flowchart 200 providing an overview of the operation of the electronic publishing system 100. As is indicated by FIGS. 1-2, a sample input file 124 is initially created by a designer or other user of the client 106 (stage 202). Once the template document has been designed and created using the layout engine 116 (stage 206), the variable data document design program 112 generates a preview document by inserting information from the sample input file 124 into the template document. The preview document is then displayed by a Web browser 120 executed by the client 106 and reviewed by the document designer (stage 208). If the desired document appearance has not been achieved, the design or input data is modified (stage 212) and a new preview document is rendered upon a display (not shown) by the Web browser 120. This process iteratively continues until a template document has been created which, when loaded with the information from the sample input file 124, results in the Web browser 120 displaying a preview document of desired appearance.

Once the design of the template document has been substantially finalized, the Web form definition module 118 may be used to design the appearance of a "Web form" to be presented via the Web browser 110 of the user client 108 (stage 216). As is discussed below, the Web form definition module 118 poses a series of questions to the user of client 106 with respect to each data field of the final template document. These questions may relate to, for example, the data type of the field, whether it is a "required" field, the visibility of the field, the appearance of various lists and other options from which data values for the field may be selected, and the like. Once these aspects of the Web form have been defined, the variable data document design program 112 performs a "collect" operation pursuant to which information describing the template document and Web form are encapsulated within a variable data design file (stage 220). In an exemplary embodiment the variable data design file is of the ".zip" file format. The variable data design file will typically contain the template document, information from the sample input file 124, the definition of the Web form (e.g., in an XML format), and composition options and fonts needed to run the job defined by this file on another computer. Once the variable data design file has been assembled, it is uploaded from the client 106 to the publication server 102 and used to generate the Web form in the manner described below (stage 224).

Upon receiving a variable data design file, the publication server 102 extracts and stores the template document 130, Web form definition file 132 and composition options and fonts 134 (stage 228). In response to a prompt from a user of client 108, a Web form generator 140 executed by the server 102 generates a Web form using the Web form definition file 132 for display at the client 108 (stage 232). More specifically, through the Web browser 110 a user of the client 108 may view the Web form, fill in fields, select options from pick lists, choose graphics, and the like (stage 236). The data obtained by the publication server 102 through the Web form is then converted into a data file 138 (stage 240), which is provided to a composition engine 144 along with the template document 130 (stage 244). A low resolution preview of the final document created based upon the user data 138 entered through the Web form may also be generated by a composition engine 144 to determine if any adjustments to the user data 138 are desired (stage 248). If adjustments are desired, the Web form is again displayed and processing returns to stage 236. Once a preview document of acceptable appearance has been displayed, the user of the client 108 accepts the current values of the user data 138 through the Web browser 110 and a final document is created by the composition engine 144 and rendered by the client 108 (stage 252). In the exemplary embodiment the composition engine 144 and Web form generator 140 comprise portions of the DL Formatter® DL-1000 software program available from Printable Technologies, Inc. of Solana Beach, Calif.

Web Form Definition

Figure 3:
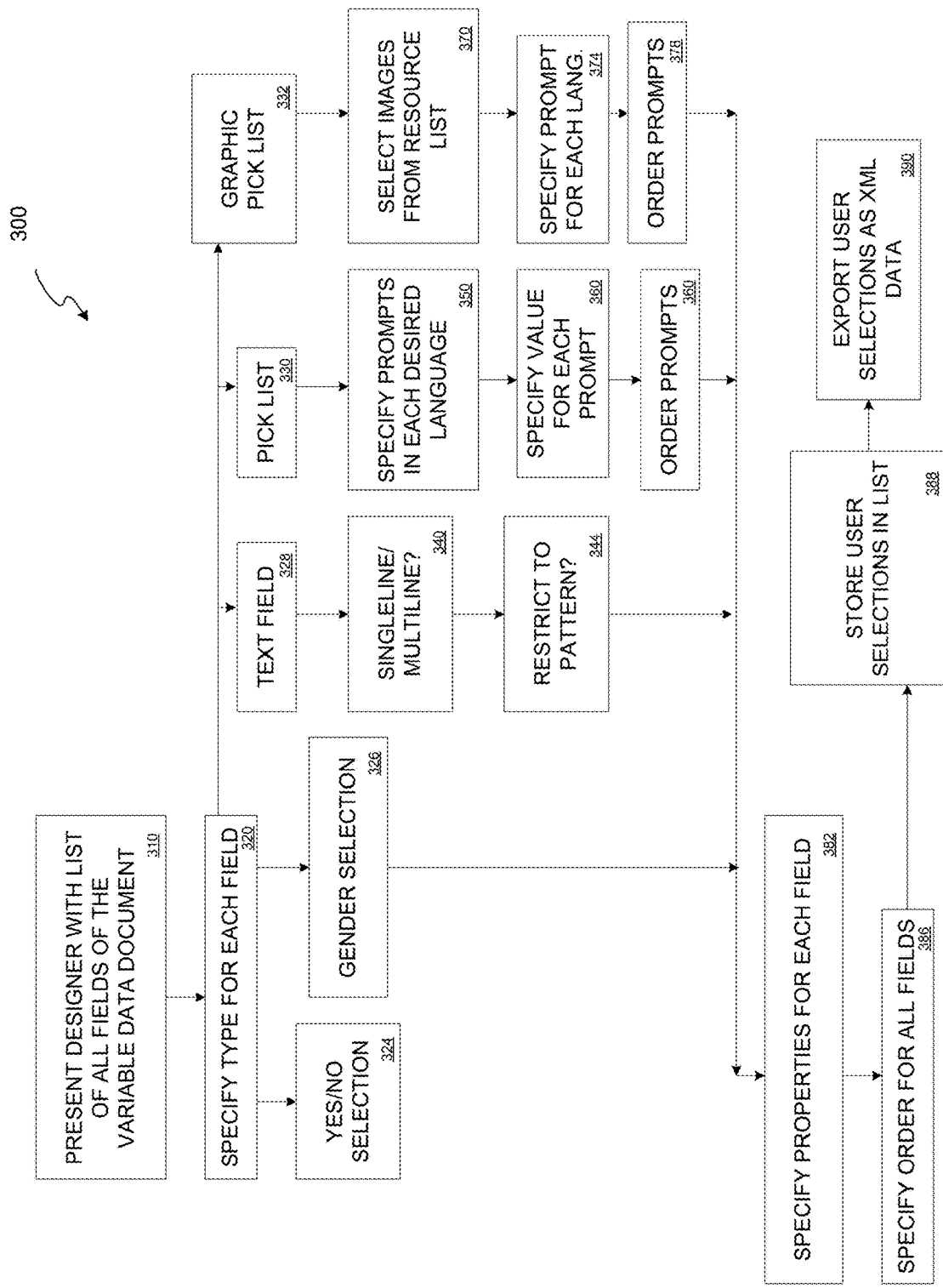
FIG. 3 shows a flowchart which illustrates the workflow relevant to the creation of a Web form disposed to facilitate distributed design of a variable data document.
Figure 6:
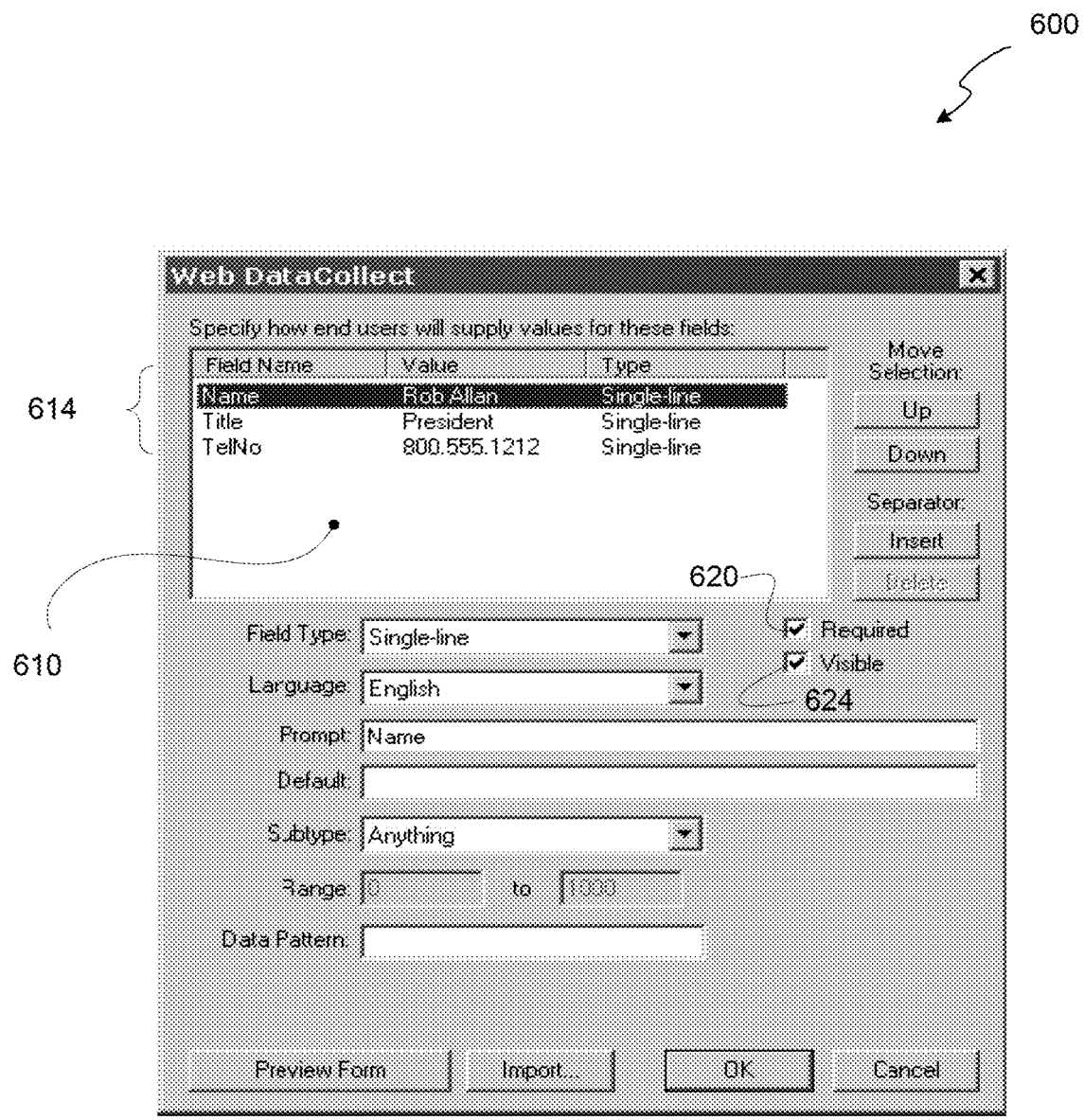
FIG. 6 illustrates a screen shot of an exemplary user interface window presented to a designer of a Web form through which data used in personalizing a variable data document may be entered.

Turning now to FIG. 3, there is shown a flowchart 300 which illustrates the workflow relevant to the design and creation of the Web form using the variable data document design program 112. The sequence of FIG. 3 presupposes that the design of a variable data template document has been completed using the layout engine 116 in the manner described above. Once this has occurred, the designer of the Web form is presented, via a user interface of the client 106, with a list of all the data fields included within the template document (stage 310). This is illustrated by the screen shot of an exemplary user interface window 600 of FIG. 6, which includes a field pane 610 containing a listing of the fields 614 of a template document for a business card.

Figure 7A:
FIGS. 7A-7H respectively illustrate the appearance of various types of fields which may appear on a Web form.
Figure 7B:
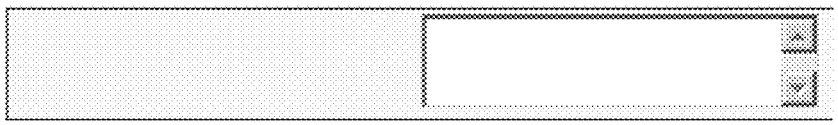
Figure 7C:
Figure 7D:
Figure 7E:
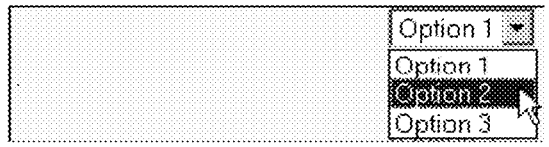
Figure 7F:
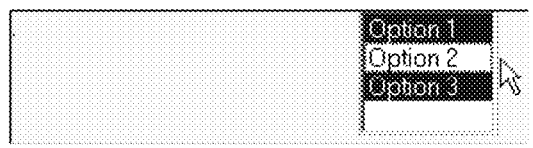
Figure 7G:
Figure 7H:
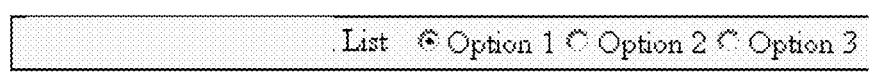

Referring again to FIG. 3, a user of the client 106 may specify a type for each field of the Web form through which data is to be entered (stage 320). For example, in an exemplary embodiment, a field may be of one of the following types: yes/no selection 324, gender selection 326, text field 328, pick list 330 or graphic pick list 332. FIGS. 7A-7H respectively illustrate the appearance of various ones of these types of fields. Specifically, FIG. 7A depicts a single-line text box; FIG. 7B illustrates a multi-line text box; FIG. 7C shows a gender radio button set; FIG. 7D illustrates a yes/no radio button set; FIG. 7E depicts a drop-down pick list; FIG. 7F shows a multi-select pick list; FIG. 7G depicts a single select pick list; and FIG. 7H shows a radio button set pick list. By selecting the manner in which each field of the Web form appears to a user of the client 108, a designer of the Web form may elect to permit such a user to enter text in a free form manner or force the user to choose among predefined values.

In the case of a text field 328, either a single line or multi-line text field may be specified (stage 340). In general, arbitrary data may be entered by a user of the client 108 within a text field 328 of the Web form rendered by the browser 110. However, the user of designer client 106 may specify a pattern which must be matched by the data entered into the applicable text field of the Web form (stage 344). For example, if the text field corresponds to a phone number, it may be specified that the user of client 108 must enter a value consisting only of numbers and spaces/dashes.

Figure 10A:
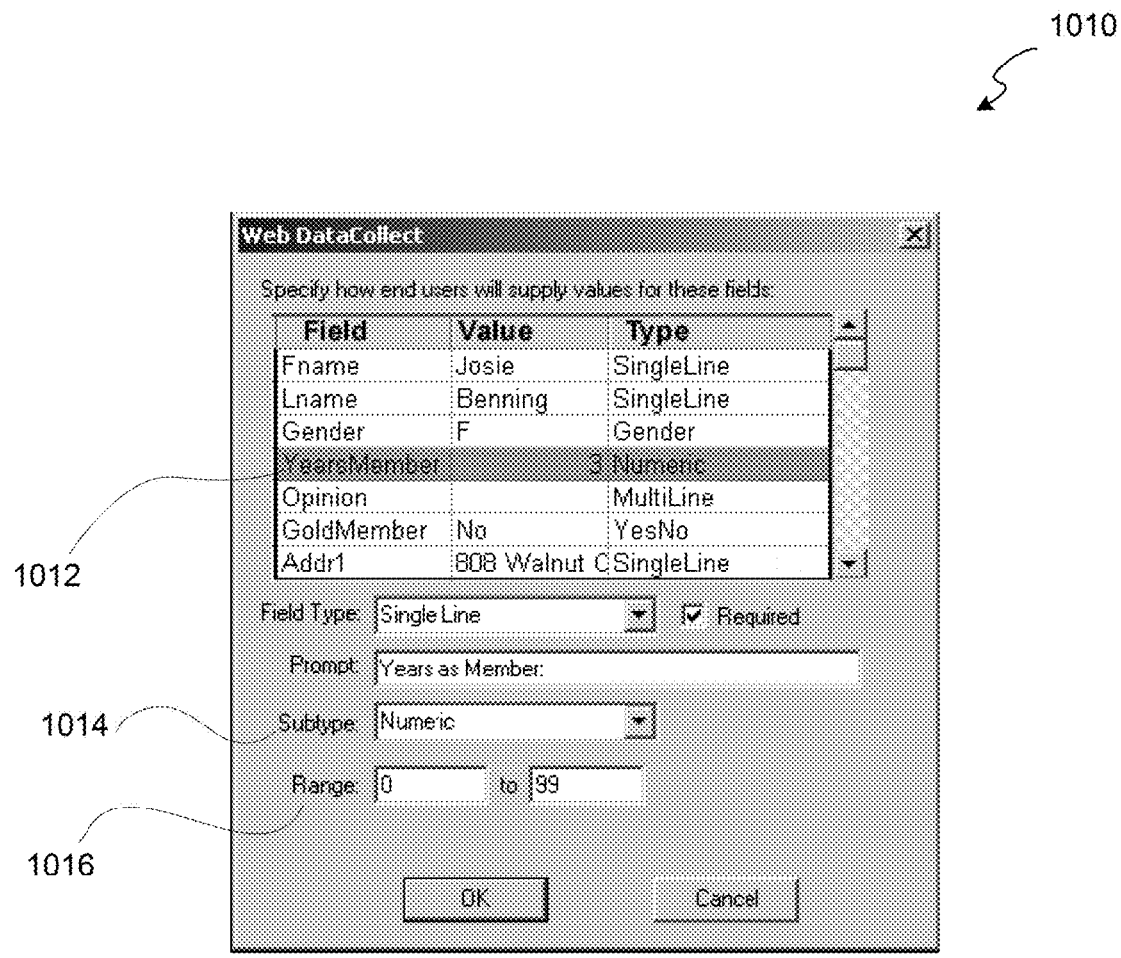

FIG. 10A provides an illustrative representation of a user interface 1010 generated by the variable data document design program 112 through which information defining a particular single-line field 1012 has been entered. As mentioned above, a single-line field is often used for a data field such as a first name, address, and the like. It may also be restricted by number of characters or by subtype (e.g., numeric or integer). In the case of FIG. 10A, the single-line field 1012 has been defined to be of the "Numeric" subtype by appropriate selection of a drop-down element in subpane 1014. As shown, a range can be specified through subpane 1016 in the case of fields of the Numeric subtype.

Figure 10B:
Figure 10C:

Turning now to FIG. 10B, there is shown a user interface 1020 generated by the variable data document design program 112 through which information defining a particular multi-line field 1012 has been entered. Similarly, FIG. 10C illustratively represents a user interface 1030 which has been used to define a multi-line field 1032 in which rich formatting of the information entered in the field has been allowed.

Figure 8:
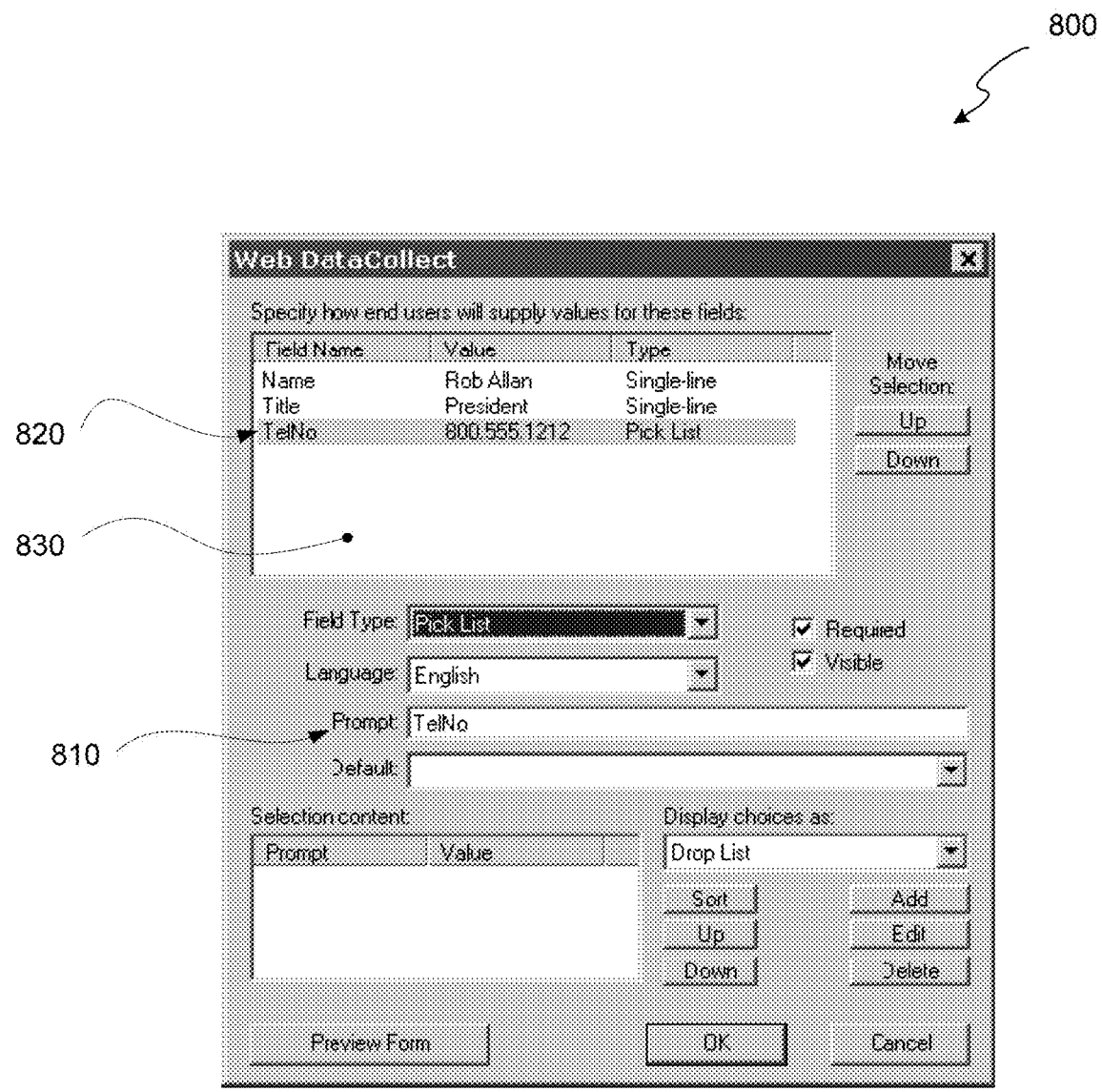
FIG. 8 depicts a screen shot of another user interface through which a designer of a Web form may specify the prompts appearing in association with the selectable options of the form.
Figure 10D:
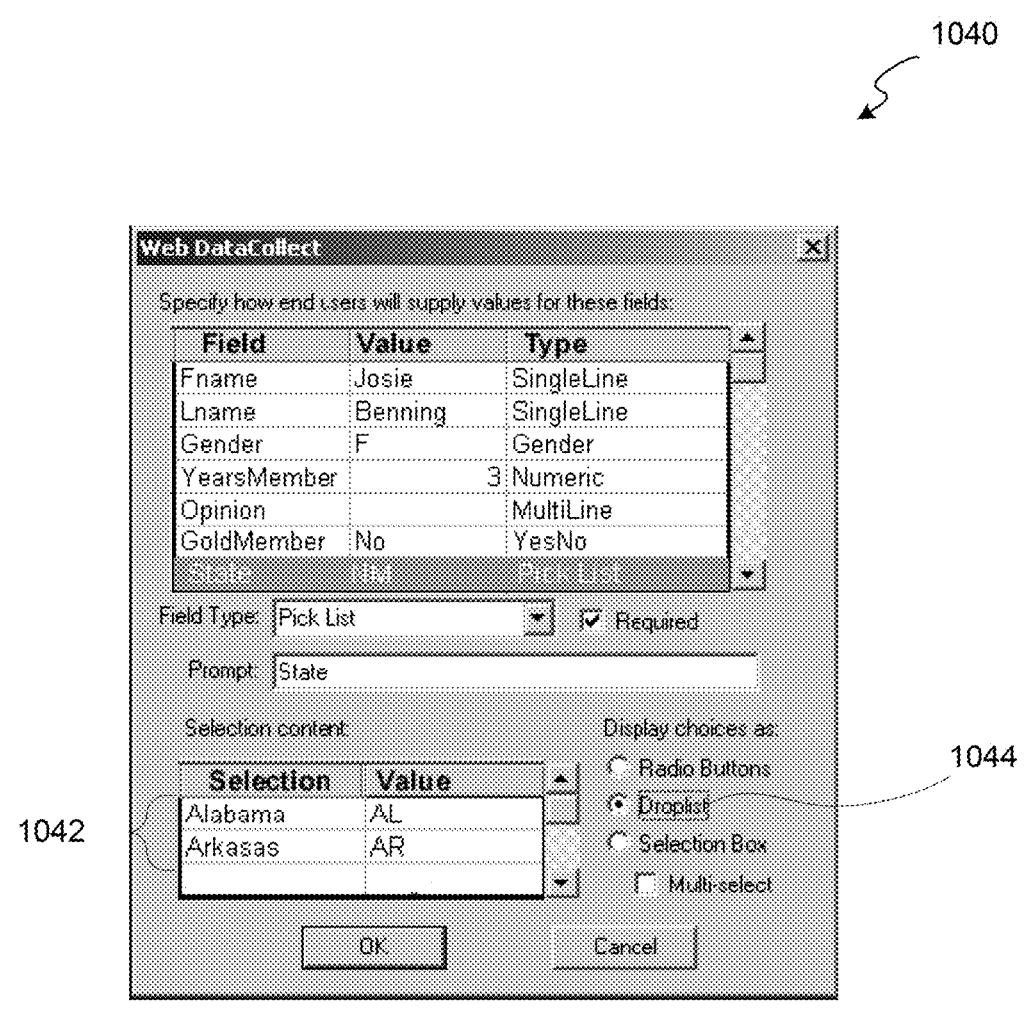

In the case of a pick list 330, the variable data document design program 112 enables a designer of the Web form to specify (in one of a number of predefined languages) the prompt appearing beside the pick list on the Web form (stage 350). For example, FIG. 8 depicts a screen shot of a designer interface 800 generated by the document design program 112 in which the text "TelNo" has been entered in a "Prompt" field 810. As shown, the "TelNo" prompt entered in field 810 is associated with a "TelNo" field 820 highlighted within field pane 830. In the case of a pick list 330, the variable data document design program 112 also enables a value to be specified for the prompt associated with each selectable option of a given pick list and the value stored should a particular option be selected (stage 360). The order within the pick list of the prompts corresponding to the various selectable options may also be specified (stage 364). As mentioned above, the prompts for the various selectable options in a pick list may be displayed using, for example, a list box, radio button set, or drop-down list. For example, FIG. 10D depicts a user interface 1040 through which it has been specified that the selectable options 1042 of a pick list will be displayed as a drop-down list 1044.

Figure 10E:
Figure 10F:
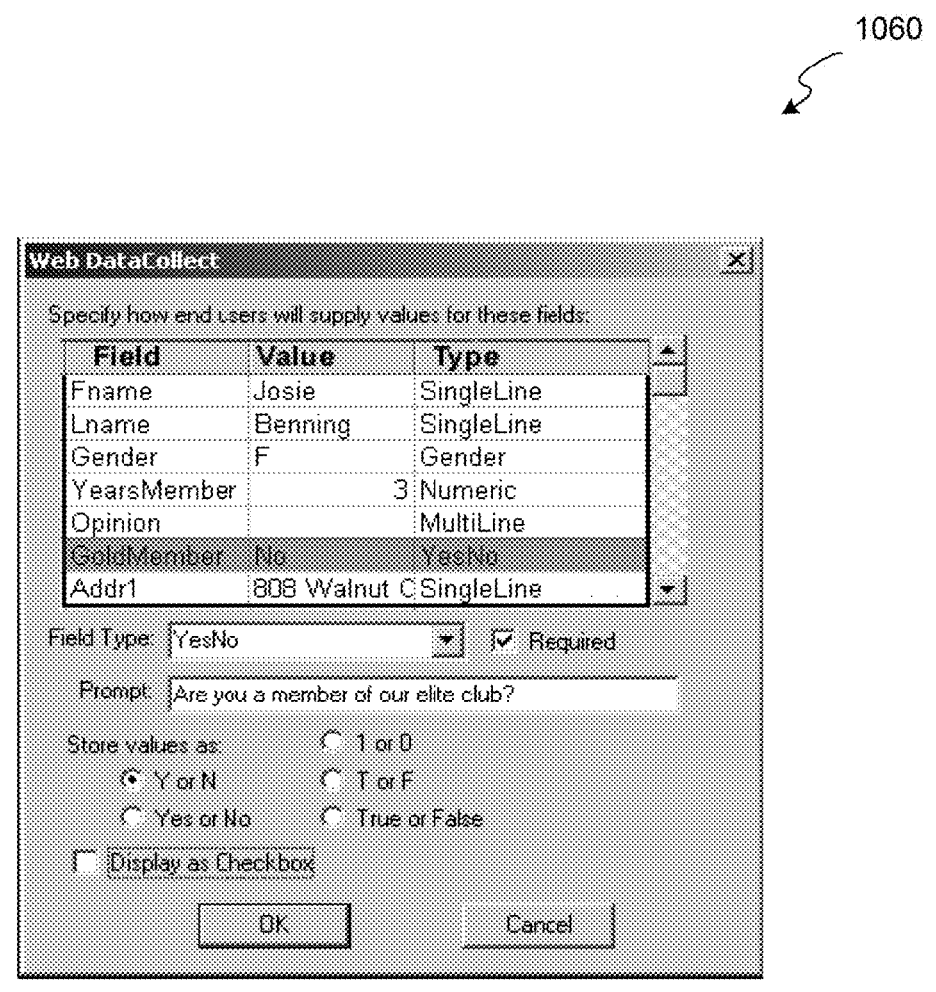

Both the yes/no selection 324 and gender selection 326 fields types may be considered special cases of the pick list field type. In the exemplary embodiment each of these field types are preconfigured and thus enable a user of designer client 106 to easily add a gender selection or a yes/no selection without having to begin with a generalized pick list field and add yes/no or gender entries. FIGS. 10E and 10F depict a user interface 1050 and a user interface 1060 through which gender and yes/no field types have been respectively defined.

A graphic pick list 332 enables a designer of the Web form to specify prompts for each image resource that has been incorporated into the design of the Web form. In exemplary implementations a resource list of stock images are made available on the client 106 for use by the designer of the Web form (i.e., the user of designer client 106). The designer may then specify various images from the resource list for association with the fields of the Web form (stage 370). The designer also provides a prompt for each resource (stage 374) and specifies an order of appearance of each such resource prompt within a given pick list (stage 378).

As indicated by FIG. 3, the designer of the Web form may also specify various properties for each field of the Web form (stage 382). For example, the designer may indicate whether a highlighted one of the fields within the field listing 614 of the user interface window 600 displayed by client 106 (FIG. 6) is required by checking the Required box 620 and whether or not such field is to be hidden (and thus incapable of being modified) by checking the Visible box 624. The designer of the Web form may also specify the order in which the fields of the form are to be displayed (stage 386). Once the form definition is completed and the various selections of the designer are stored (stage 388), the designer can preview the form using the Web browser 120 to see a representation of that form. Since the ultimate appearance of the Web form to a user of client 108 will be dependent upon characteristics of the publication server 102 to which it is uploaded, the preview of the Web form generated by the Web browser 120 may be a rather generic representation. However, this preview should nonetheless provide the designer with a reasonable indication of the flow and functionality of the Web form, if not its actual appearance.

Once finalized, the definition of the Web form is stored in an XML file in association with the template document (stage 390). Table I below provides a specific example of an XML-based Web form definition 508. In this case the form definition 508 comprises the data representation in XML of a particular Web form presented to the user of client 108 as an HTML page.

As was described above with reference to FIG. 2, the XML form definition and template document are collected into a variable data design file along with any other files necessary to remotely run a job based upon the template document. This variable data design file, which again is typically of the ".zip" format, is then uploaded to the publication server 102.

Figure 5:
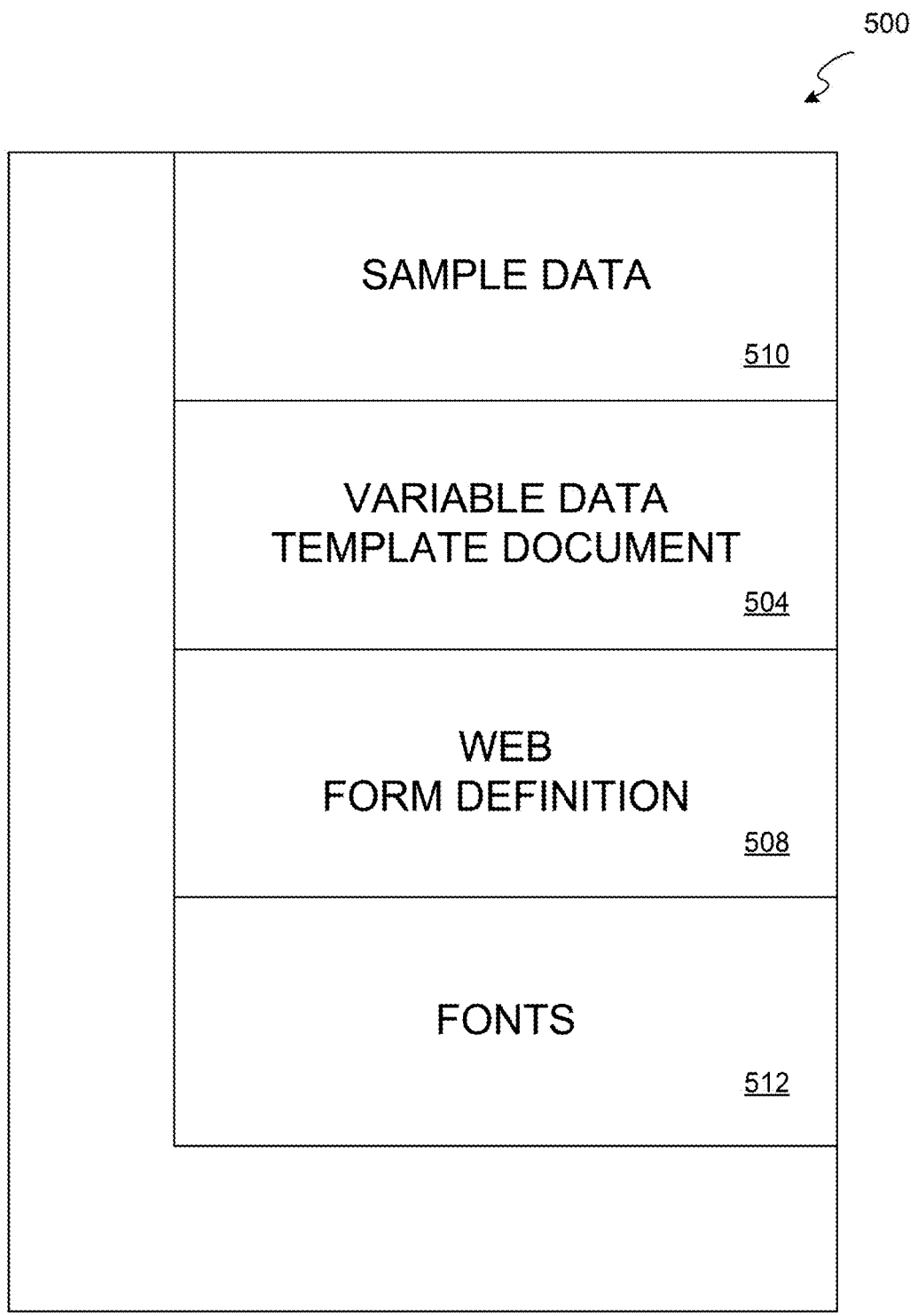
FIG. 5 provides an illustrative representation of an exemplary variable data design file.

FIG. 5 provides an illustrative representation of an exemplary variable data design file 500. As shown, the design file includes a variable data template document 504, a Web form definition 508, sample data 510 and fonts 512.

Server-Side Processing

Figure 4:
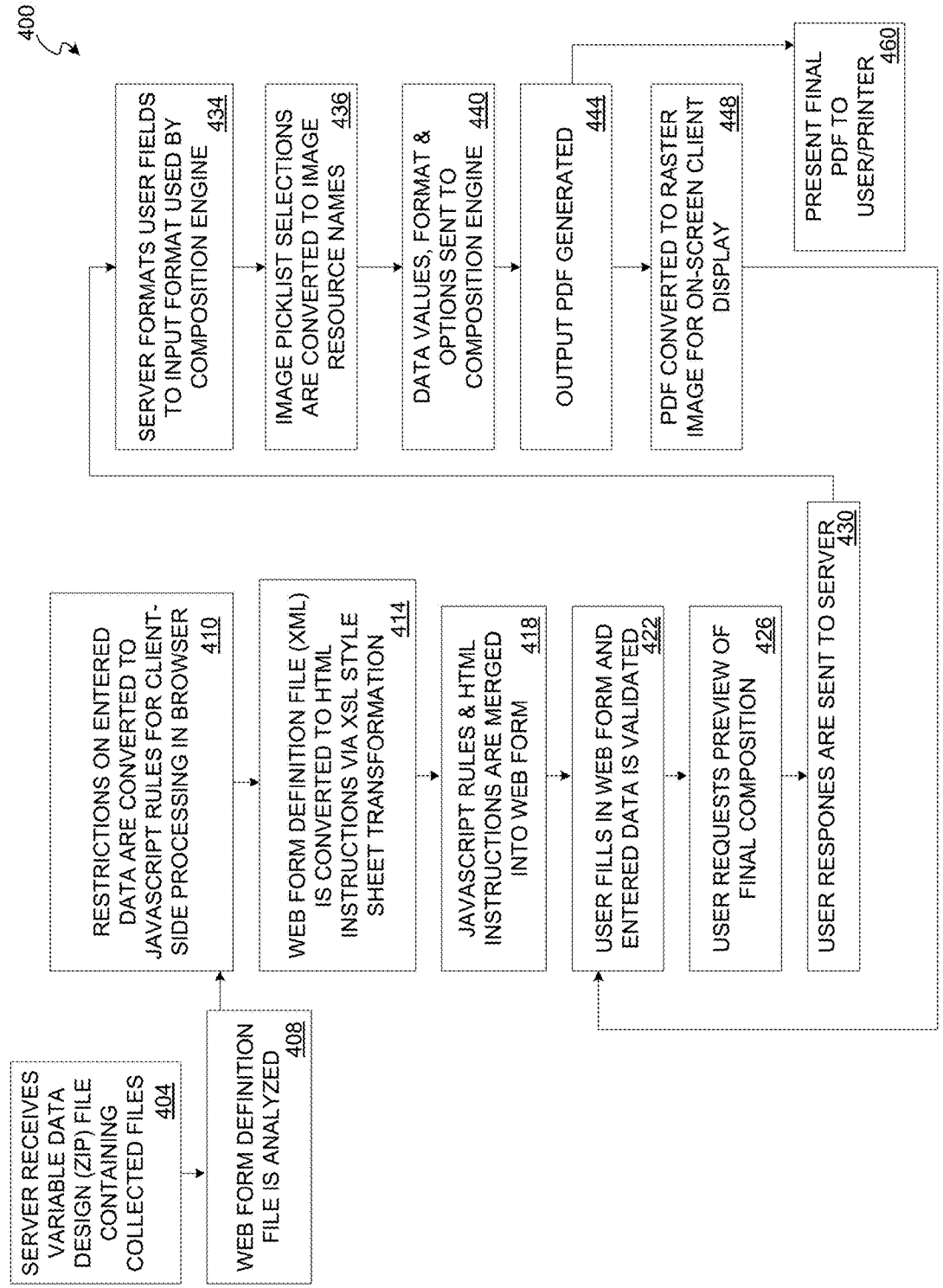
FIG. 4 is a flowchart illustrating an exemplary manner in which a publication server generates Web forms for display by a remote client based upon a variable data design file received from a different client.

Attention is now directed to FIG. 4, which is a flowchart 400 illustrating an exemplary manner in which the publication server 102 generates, based upon variable data design files received from the designer client 106, Web forms for display by the client 108. Upon receipt of the variable data design file from the client 106 through network interface 148, the template document 130 and Web form definition file 132 (typically in an XML format) and any other constituents of the design file are extracted and stored within the local file system of the publication server 102 (stage 404). When a user of the client 108 desires to create a personalized document using the template document 130, analysis and conversion of the associated Web form definition file 132 into a Web form capable being displayed by the Web browser 110 is initiated by the Web form generator 140 (stage 408). In the exemplary embodiment the Web form generator 140 performs a set of XSL transformations upon the XML-based Web form definition file 132 in order to create code in the form of JavaScript rules used in validating the values entered into the Web form via client 108 prior to uploading of such values to the publication server 102 (stage 410). For example, if a given Web form has a required "first name" field, the JavaScript rules will detect that appropriate data is entered into this field prior to permitting this data to be sent to the publication server 102. Table II below contains an exemplary XSL file capable of being used to create this type of validation code on the basis of an XML-based Web form definition file.

Similarly, in the exemplary embodiment the Web form generator 140 also sends the XML-based Web form definition file 132 through another transforming XSL file that converts its XML contents into HTML form instructions (stage 414). These form instructions control the display of information within the Web form as, for example, a single entry list box, as a drop list, or whatever format is requested in the original XML-based Web form definition file 132. The JavaScript rules and HTML form instructions are then combined by the Web form generator 140, and the resulting Web form is presented to the user of client 108 via Web browser 110 (stage 418). Table III below contains an exemplary XSL file capable of being used to convert an XML-based Web form definition file into an HTML page comprising a Web form.

Figure 9:
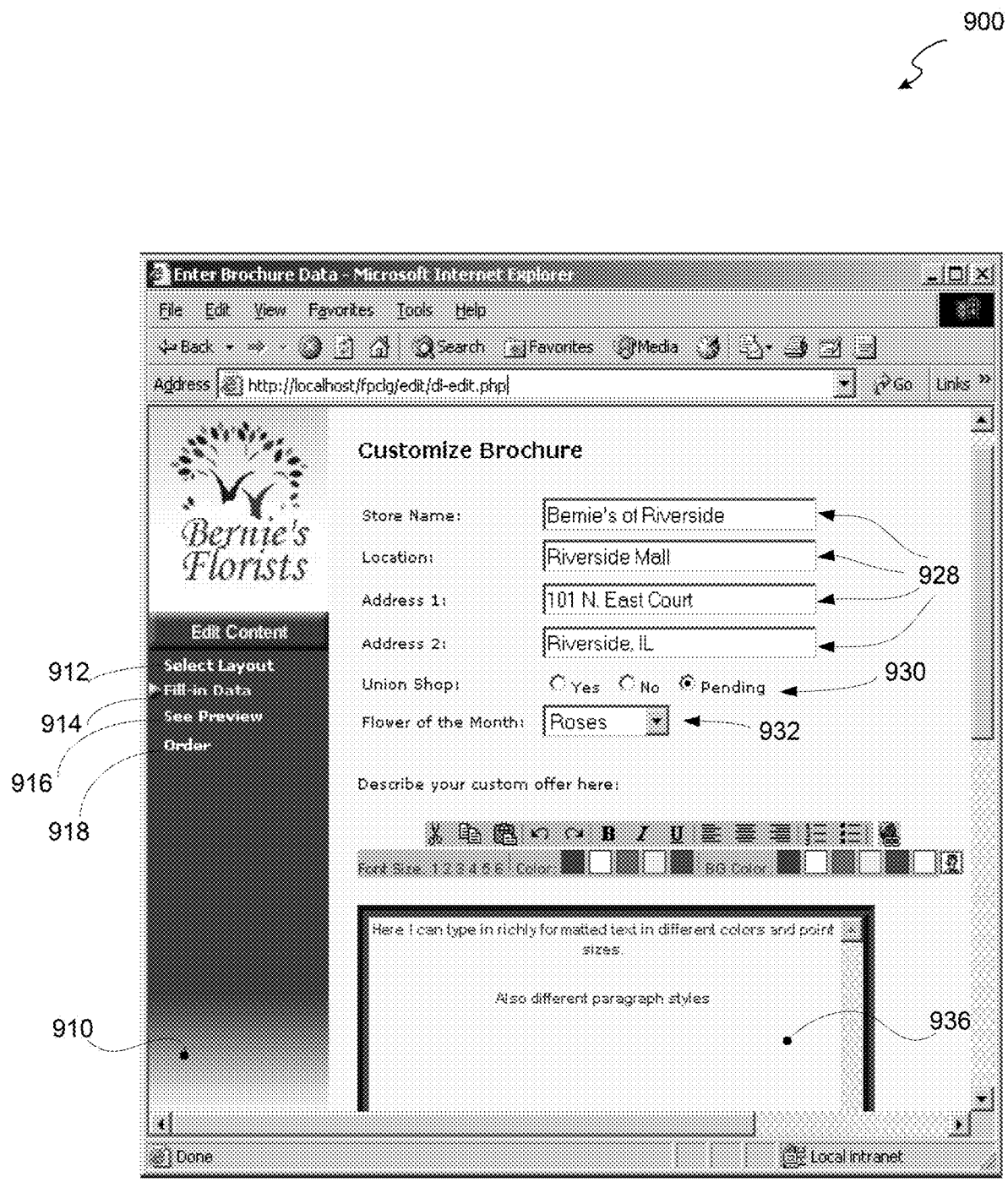
FIG. 9 is a screen shot of an exemplary Web form as displayed by a remote client upon being generated at a publication server.

FIG. 9 is a screen shot of an exemplary Web form 900 as displayed by Web browser 110 of client 108 upon being generated by the Web form generator 140. As shown, the Web form 900 includes an Edit Content pane 910 in which are displayed the following selectable options: Select Layout 912, Fill-in Data 914, See Preview 916 and Order 918. In the example of FIG. 9, the Fill-in Data option 914 has been selected and thus a primary pane 922 of the Web form 900 is displayed to facilitate data entry. Data may be entered into the pane 922 via the single-line fields 928, radio buttons 930, drop-down menu 932 and multi-line window 936.

Referring again to FIG. 4, as the user of client 108 fills in the Web form (e.g., the Web form 900) and attempts to submit it to the publication server 102, the JavaScript rules referenced above validate that data has been appropriately entered into the form (stage 422). This validation operation will typically include checking that the data entered into the fields of the Web form match the data pattern specified in the Web form definition file 132. Once the fields of the form have been filled in, the user of client 108 may elect to view either a preview or full-resolution version of the output document generated by the composition engine 144 based upon the data entered through these fields (stage 426). The user may request such a preview by selecting the appropriate button or other icon displayed by the form (e.g., the See Preview option 916), which results in the values entered via the Web form being sent to the server as a standard HTML form post request (stage 430). In response to user selection of the Preview option 916, the composition engine 144 creates a low-resolution document which is suitable for display via Web browser 110 but is not suitable for printing.

Upon receiving from the client 108 the user data values 138 entered via the Web form, these data values are aggregated into a data input file suitably formatted for use by the composition engine (stage 434). In addition, any image pick list selections are converted to image resource names (stage 436). Next, this data input file and image resource information is sent to the composition engine 144 along with the template document 130 and applicable composition options (e.g., output to PDF or to PostScript) and fonts 134 (stage 440). The composition engine 144 processes this information and creates an output PDF file (stage 444). This output PDF file may then be converted to a JPEG or similar raster image for display by the client 108 (stage 448). The user of the client may then iteratively refine the appearance of the output document by changing data as needed via the Web form and viewing new results (repeat stages 422-448). When the results are acceptable, the user of client 108 provides an indication of satisfaction and the composition engine 144 creates a final, high-resolution output document (e.g., in PDF format) for output to a display or printer (stage 460).

TABLE I

```
<?xml version="1.0" encoding="ISO-8859-1" ?>
<form version="1.0">
 <title />
 <fieldlist>
 <field required="Y" visible="Y" type="SINGLELINE" subtype="A">
  <fieldname>FName</fieldname>
  <prompt>First Name</prompt>
  <default />
  <orgvalue />
  </field>
 <field required="Y" visible="Y" type="SINGLELINE" subtype="A">
  <fieldname>LName</fieldname>
  <prompt>Last Name</prompt>
  <default />
  <orgvalue />
  </field>
 <field required="Y" visible="Y" type="SINGLELINE" subtype="A">
  <fieldname>Add1</fieldname>
  <prompt>Add1</prompt>
  <default />
  <orgvalue />
  </field>
 <field required="N" visible="Y" type="SINGLELINE" subtype="A">
  <fieldname>Add2</fieldname>
  <prompt>Add2</prompt>
  <default />
  <orgvalue />
  </field>
 <field required="Y" visible="Y" type="SINGLELINE" subtype="A">
  <fieldname>City</fieldname>
  <prompt>City</prompt>
  <default />
  <orgvalue />
  </field>
 <field required="Y" visible="Y" type="SINGLELINE" subtype="A">
  <fieldname>St</fieldname>
  <prompt>St</prompt>
  <default />
  <orgvalue />
  </field>
 <field required="Y" visible="Y" type="PICKLIST"
  subtype="DROPLIST" autosort="N">
  <fieldname>Zip</fieldname>
  <prompt>Zip</prompt>
  <default>0</default>
  <orgvalue />
 <picklist>
```

TABLE I-continued

```
 <item>
  <prompt>First</prompt>
  <value>Second</value>
  </item>
 <item>
  <prompt>Second</prompt>
  <value>Second</value>
  </item>
 <item>
  <prompt>Third</prompt>
  <value>Third</value>
  </item>
  </picklist>
  </field>
 <field required="Y" visible="Y" type="PICKLIST"
  subtype="DROPLIST" autosort="N">
  <fieldname>Loc</fieldname>
  <prompt>Loc</prompt>
  <default>0</default>
  <orgvalue />
 <picklist>
 <item>
  <prompt>Jefferson Bldg.</prompt>
  <value>Loc 3</value>
  </item>
 <item>
  <prompt>Main Office</prompt>
  <value>Loc1</value>
  </item>
 <item>
  <prompt>Palm Center</prompt>
  <value>Loc3</value>
  </item>
  </picklist>
  </field>
 <field required="Y" visible="Y" type="PICKLIST"
  subtype="DROPLIST" autosort="N">
  <fieldname>Phone</fieldname>
  <prompt>Phone</prompt>
  <default>1</default>
  <orgvalue />
 <picklist>
 <item>
  <prompt>One</prompt>
  <value>One</value>
  </item>
 <item>
  <prompt>Two</prompt>
  <value>Two</value>
  </item>
 <item>
  <prompt>Three</prompt>
  <value>Three</value>
  </item>
 <item>
  <prompt>Four</prompt>
  <value>Four</value>
  </item>
 <item>
  <prompt>Fifth</prompt>
  <value>Fifth</value>
  </item>
 <item>
  <prompt>Six</prompt>
  <value>Six</value>
  </item>
 <item>
  <prompt>Seven</prompt>
  <value>Seven</value>
  </item>
 <item>
  <prompt>Eight</prompt>
  <value>Eight</value>
  </item>
  </picklist>
  </field>
 <field required="Y" visible="Y" type="SINGLELINE" subtype="A">
  <fieldname>Fax</fieldname>
  <prompt>Fax</prompt>
  <default />
```

TABLE I-continued

```
     <orgvalue />
    </field>
-  <field required="Y" visible="Y" type="SINGLELINE" subtype="A">
    <fieldname>Email</fieldname>
    <prompt>Email</prompt>
    <default />
    <orgvalue />
   </field>
-  <field required="Y" visible="Y" type="SINGLELINE" subtype="A">
    <fieldname>Tagline</fieldname>
    <prompt>Tagline</prompt>
    <default />
    <orgvalue />
   </field>
  </fieldlist>
 </form>
```

TABLE II

```
<?xml version="1.0" encoding="ISO-8859-1" ?>
- <xsl:stylesheet version="1.0"
  xmlns:xsl="http://www.w3.org/1999/XSL/Transform">
   <xsl:output method="xml" />
-  <xsl:template match="/">
    <xsl:apply-templates />
   </xsl:template>
-  <xsl:template match="form">
-   <SCRIPT>
    <xsl:attribute name="Language">JavaScript</xsl:attribute>
    <xsl:text>function checkInputs(f) { retval = 1; Checks = 0;</xsl:text>
    <xsl:apply-templates />
    <xsl:text>alert("Form OK. Would now submit."); return
    false;}</xsl:text>
   </SCRIPT>
  </xsl:template>
-  <xsl:template match="fieldlist">
    <xsl:apply-templates />
   </xsl:template>
-  <xsl:template match="field[@type='SINGLELINE'][@subtype='A']">
-  <!-- A single line of alphanumeric input
   -->
-  <xsl:choose>
-   <xsl:when test="@required[.='Y']">
    <xsl:text>if (customize.</xsl:text>
    <xsl:value-of select="htmlfieldname" />
    <xsl:text>.value== "") {alert("Please enter a value:</xsl:text>
    <xsl:value-of select="prompt" />
```

TABLE II-continued

```
    <xsl:text>");return(false);}</xsl:text>
   </xsl:when>
   </xsl:choose>
  </xsl:template>
-  <xsl:template match="field[@type='SINGLELINE'][@subtype='I']">
-  <!-- Integer data
   -->
-  <xsl:choose>
-   <xsl:when test="@required[.='Y']">
    <xsl:text>if (customize.</xsl:text>
    <xsl:value-of select="htmlfieldname" />
    <xsl:text>.value== "") {alert("Please enter an integer:</xsl:text>
    <xsl:value-of select="prompt" />
    <xsl:text>");return(false);}</xsl:text>
   </xsl:when>
   </xsl:choose>
    <xsl:text>if (customize.</xsl:text>
    <xsl:value-of select="htmlfieldname" />
    <xsl:text>.value-0 != parseInt(customize.</xsl:text>
    <xsl:value-of select="htmlfieldname" />
    <xsl:text>.value)) {alert("Please enter an integer:</xsl:text>
    <xsl:value-of select="prompt" />
    <xsl:text>");return(false);}</xsl:text>
  </xsl:template>
-  <xsl:template match="field[@type='SINGLELINE'][@subtype='N']">
-  <!-- Non-Integer data
   -->
-  <xsl:choose>
-   <xsl:when test="@required[.='Y']">
    <xsl:text>if (customize.</xsl:text>
    <xsl:value-of select="htmlfieldname" />
    <xsl:text>.value== "") {return(false);}</xsl:text>
   </xsl:when>
   </xsl:choose>
    <xsl:text>if (customize.</xsl:text>
    <xsl:value-of select="htmlfieldname" />
    <xsl:text>.value-0 != parseFloat(customize.</xsl:text>
    <xsl:value-of select="htmlfieldname" />
    <xsl:text>.value)) {alert("Please enter a number:</xsl:text>
    <xsl:value-of select="prompt" />
    <xsl:text>");return(false);}</xsl:text>
  </xsl:template>
  <xsl:template match="field[@type='MULTILINE']" />
  <xsl:template match="field[@type='PICKLIST']" />
  <xsl:template match="field[@type='GENDER']" />
  <xsl:template match="field[@type='YESNO']" />
 </xsl:stylesheet>
```

TABLE III

```
<?xml version="1.0" encoding="ISO-8859-1" ?>
- <xsl:stylesheet version="1.0" xmlns:xsl="http://www.w3.org/1999/XSL/Transform">
   <xsl:output method="html" />
-  <xsl:template name="invisible">
    <xsl:param name="name" />
    <xsl:param name="value" />
-  <!-- Turns a control into a hidden element
   -->
-   <INPUT type="hidden">
-    <xsl:attribute name="name">
     <xsl:value-of select="$name" />
    </xsl:attribute>
-    <xsl:attribute name="value">
     <xsl:value-of select="$value" />
    </xsl:attribute>
   </INPUT>
  </xsl:template>
-  <xsl:template match="/">
    <xsl:apply-templates />
   </xsl:template>
-  <xsl:template match="form">
-   <form>
    <xsl:attribute name="action">DLValidate.asp</xsl:attribute>
    <xsl:attribute name="method">post</xsl:attribute>
    <xsl:attribute name="name">customize</xsl:attribute>
    <xsl:attribute name="onSubmit">return checkInputs(this);</xsl:attribute>
```

TABLE III-continued

```
<table cellspacing="0" cellpadding="3" border="0">
<tbody>
<xsl:apply-templates />
<tr valign="top">
<td align="center">
<Input name="SubmitButton" value="Submit" type="submit" />
</td>
<!-- <td align="center"> </td>
-->
<td align="center">
<Input name="ResetButton" value="Reset" type="reset" />
</td>
</tr>
</tbody>
</table>
<p>
Fields marked with a
<font color="red">
<small>*</small>
</font>
are required.
</p>
</form>
</xsl:template>
<xsl:template match="fieldlist">
<xsl:apply-templates />
</xsl:template>
<xsl:template match="field[@type='SINGLELINE'][@subtype='A']">
<!-- A single line of alphanumeric input
-->
<xsl:choose>
<xsl:when test="@visible[.='N']">
<xsl:call-template name="invisible">
<xsl:with-param name="name" select="htmlfieldname" />
<xsl:with-param name="value" select="default" />
</xsl:call-template>
</xsl:when>
<xsl:otherwise>
<tr valign="top">
<td align="left">
<LABEL>
<xsl:attribute name="for">
<xsl:value-of select="htmlfieldname" />
</xsl:attribute>
<xsl:value-of select="prompt" />
</LABEL>
<!-- </td>
-->
<!-- <td align="center">
-->
<xsl:choose>
<xsl:when test="@required[.='Y']">
<font color="red">
<small>*</small>
</font>
</xsl:when>
<xsl:otherwise> </xsl:otherwise>
</xsl:choose>
</td>
<td align="left">
<INPUT type="text">
<xsl:attribute name="id">
<xsl:value-of select="htmlfieldname" />
<xsl:attribute>
<xsl:attribute name="name">
<xsl:value-of select="htmlfieldname" />
</xsl:attribute>
<xsl:attribute name="value">
<xsl:value-of select="default" />
</xsl:attribute>
</INPUT>
<xsl:if test="@required[.='Y']" />
</td>
</tr>
</xsl:otherwise>
</xsl:choose>
</xsl:template>
<xsl:template match="field[@type='SINGLELINE'][@subtype='I']">
<!-- Integer data
-->
```

TABLE III-continued

```
- <xsl:choose>
- <xsl:when test="@visible[.='N']">
- <xsl:call-template name="invisible">
  <xsl:with-param name="name" select="htmlfieldname" />
  <xsl:with-param name="value" select="default" />
  </xsl:call-template>
  </xsl:when>
- <xsl:otherwise>
- <tr valign="top">
- <td align="left">
- <LABEL>
- <xsl:attribute name="for">
  <xsl:value-of select="htmlfieldname" />
  </xsl:attribute>
  <xsl:value-of select="prompt" />
  </LABEL>
- <!-- </td>
  -->
- <!-- <td align="center">
  -->
- <xsl:choose>
- <xsl:when test="@required[.='Y']">
- <font color="red">
  <small>*</small>
  </font>
  </xsl:when>
  <xsl:otherwise> </xsl:otherwise>
  </xsl:choose>
  </td>
- <td align="left">
- <INPUT type="text">
- <xsl:attribute name="id">
  <xsl:value-of select="htmlfieldname" />
  </xsl:attribute>
- <xsl:attribute name="name">
  <xsl:value-of select="htmlfieldname" />
  </xsl:attribute>
- <xsl:attribute name="value">
  <xsl:value-of select="default" />
  </xsl:attribute>
  </INPUT>
  <xsl:if test="@required[.='Y']" />
  </td>
  </tr>
  </xsl:otherwise>
  </xsl:choose>
  </xsl:template>
- <xsl:template match="field[@type='SINGLELINE'][@subtype='N']">
- <!-- Integer data
  -->
- <xsl:choose>
- <xsl:when test="@visible[.='N']">
- <xsl:call-template name="invisible">
  <xsl:with-param name="name" select="htmlfieldname" />
  <xsl:with-param name="value" select="default" />
  </xsl:call-template>
  </xsl:when>
- <xsl:otherwise>
- <tr valign="top">
- <td align="left">
- <LABEL>
- <xsl:attribute name="for">
  <xsl:value-of select="htmlfieldname" />
  </xsl:attribute>
  <xsl:value-of select="prompt" />
  </LABEL>
- <!-- </td>
  -->
- <!-- <td align="center">
  -->
- <xsl:choose>
- <xsl:when test="@required[.='Y']">
- <font color="red">
  <small>*</small>
  </font>
  </xsl:when>
  <xsl:otherwise> </xsl:otherwise>
  </xsl:choose>
  </td>
- <td align="left">
```

TABLE III-continued

```
- <INPUT type="text">
- <xsl:attribute name="id">
  <xsl:value-of select="htmlfieldname" />
  </xsl:attribute>
- <xsl:attribute name="name">
  <xsl:value-of select="htmlfieldname" />
  </xsl:attribute>
- <xsl:attribute name="value">
  <xsl:value-of select="default" />
  </xsl:attribute>
  </INPUT>
  <xsl:if test="@required[.='Y']" />
  </td>
  </tr>
  </xsl:otherwise>
  </xsl:choose>
  </xsl:template>
- <xsl:template match="field[@type='MULTILINE']">
- <xsl:choose>
- <xsl:when test="@visible[.='N']">
- <xsl:call-template name="invisible">
  <xsl:with-param name="name" select="htmlfieldname" />
  <xsl:with-param name="value" select="default" />
  </xsl:call-template>
  </xsl:when>
- <xsl:otherwise>
- <tr valign="top">
- <td>
  <xsl:value-of select="prompt" />
- <!-- </td>
  -->
- <!-- <td align="center">
  -->
- <xsl:choose>
- <xsl:when test="@required[.='Y']">
- <font color="red">
  <small>*</small>
  </font>
  </xsl:when>
  <xsl:otherwise> </xsl:otherwise>
  </xsl:choose>
  </td>
- <td>
- <TEXTAREA>
- <xsl:attribute name="name">
  <xsl:value-of select="htmlfieldname" />
  </xsl:attribute>
- <xsl:attribute name="rows">
  <xsl:value-of select="@linelimit" />
  </xsl:attribute>
  <xsl:value-of select="normalize-space(default)" />
  </TEXTAREA>
  <xsl:if test="@required[.='Y']" />
  </td>
  </tr>
  </xsl:otherwise>
  </xsl:choose>
  </xsl:template>
- <xsl:template match="field[@type='GENDER']">
- <xsl:choose>
- <xsl:when test="@visible[.='N']">
- <xsl:call-template name="invisible">
  <xsl:with-param name="name" select="htmlfieldname" />
  <xsl:with-param name="value" select="default" />
  </xsl:call-template>
  </xsl:when>
- <xsl:otherwise>
- <tr valign="top">
- <td>
  <xsl:value-of select="prompt" />
- <!-- </td>
  -->
- <!-- <td align="center">
  -->
- <xsl:choose>
- <xsl:when test="@required[.='Y']">
- <font color="red">
  <small>*</small>
  </font>
  </xsl:when>
```

TABLE III-continued

```
<xsl:otherwise> </xsl:otherwise>
</xsl:choose>
</td>
- <td>
- <INPUT type="radio">
- <xsl:attribute name="name">
<xsl:value-of select="htmlfieldname" />
</xsl:attribute>
- <xsl:attribute name="id">
male_
<xsl:value-of select="htmlfieldname" />
</xsl:attribute>
- <xsl:choose>
- <xsl:when test="@subtype='M_F'">
<xsl:attribute name="value">m</xsl:attribute>
</xsl:when>
- <xsl:otherwise>
<xsl:attribute name="value">male</xsl:attribute>
</xsl:otherwise>
</xsl:choose>
- <xsl:if test="default[.='M']">
<xsl:attribute name="checked">true</xsl:attribute>
</xsl:if>
</INPUT>
- <LABEL>
- <xsl:attribute name="for">
male_
<xsl:value-of select="htmlfieldname" />
</xsl:attribute>
Male
</LABEL>
- <INPUT type="radio">
- <xsl:attribute name="name">
<xsl:value-of select="htmlfieldname" />
</xsl:attribute>
- <xsl:attribute name="id">
female_
<xsl:value-of select="htmlfieldname" />
</xsl:attribute>
- <xsl:choose>
- <xsl:when test="@subtype='M_F'">
<xsl:attribute name="value">f</xsl:attribute>
</xsl:when>
- <xsl:otherwise>
<xsl:attribute name="value">female</xsl:attribute>
</xsl:otherwise>
</xsl:choose>
- <xsl:if test="default[.='F']">
<xsl:attribute name="checked">true</xsl:attribute>
</xsl:if>
</INPUT>
- <LABEL>
- <xsl:attribute name="for">
female_
<xsl:value-of select="htmlfieldname" />
</xsl:attribute>
Female
</LABEL>
</td>
</tr>
</xsl:otherwise>
</xsl:choose>
</xsl:template>
- <xsl:template match="field[@type='YESNO'][@checkbox='N']">
- <xsl:choose>
- <xsl:when test="@visible[.='N']">
- <xsl:call-template name="invisible">
<xsl:with-param name="name" select="htmlfieldname" />
<xsl:with-param name="value" select="default" />
</xsl:call-template>
</xsl:when>
- <xsl:otherwise>
- <tr valign="top">
- <td>
<xsl:value-of select="prompt" />
- <!-- </td>
-->
- <!-- <td align="center">
-->
- <xsl:choose>
```

TABLE III-continued

```
- <xsl:when test="@required[.='Y']">
- <font color="red">
  <small>*</small>
  </font>
  </xsl:when>
  <xsl:otherwise> </xsl:otherwise>
  </xsl:choose>
  </td>
- <td>
  <xsl:comment>Radio Button Version</xsl:comment>
- <INPUT type="radio">
- <xsl:attribute name="name">
  <xsl:value-of select="htmlfieldname" />
  </xsl:attribute>
- <xsl:attribute name="id">
  yes_
  <xsl:value-of select="htmlfieldname" />
  </xsl:attribute>
- <xsl:attribute name="value">
- <xsl:choose>
  <xsl:when test="@subtype='1_0'">1</xsl:when>
  <xsl:when test="@subtype='T_F'">T</xsl:when>
  <xsl:when test="@subtype='Y_N'">Y</xsl:when>
  <xsl:when test="@subtype='YES_NO'">YES</xsl:when>
  <xsl:otherwise>TRUE</xsl:otherwise>
  </xsl:choose>
  </xsl:attribute>
- <xsl:if test="default[.='1'] or default[.='Y']">
  <xsl:attribute name="checked">true</xsl:attribute>
  </xsl:if>
  </INPUT>
  <LABEL>Yes</LABEL>
- <INPUT type="radio">
- <xsl:attribute name="name">
  <xsl:value-of select="htmlfieldname" />
  </xsl:attribute>
- <xsl:attribute name="id">
  no_
  <xsl:value-of select="htmlfieldname" />
  </xsl:attribute>
- <xsl:attribute name="value">
- <xsl:choose>
  <xsl:when test="@subtype='1_0'">0</xsl:when>
  <xsl:when test="@subtype='T_F'">F</xsl:when>
  <xsl:when test="@subtype='Y_N'">N</xsl:when>
  <xsl:when test="@subtype='YES_NO'">NO</xsl:when>
  <xsl:otherwise>TRUE</xsl:otherwise>
  </xsl:choose>
  </xsl:attribute>
- <xsl:if test="default[.='0'] or default[.='N']">
  <xsl:attribute name="checked">true</xsl:attribute>
  </xsl:if>
  </INPUT>
  <LABEL>No</LABEL>
  </td>
  </tr>
  </xsl:otherwise>
  </xsl:choose>
  </xsl:template>
- <xsl:template match="field[@type='YESNO'][@checkbox='Y']">
- <xsl:choose>
- <xsl:when test="@visible[.='N']">
- <xsl:call-template name="invisible">
  <xsl:with-param name="name" select="htmlfieldname" />
  <xsl:with-param name="value" select="default" />
  </xsl:call-template>
  </xsl:when>
- <xsl:otherwise>
- <tr valign="top">
- <td>
  <xsl:value-of select="prompt" />
- <xsl:choose>
- <xsl:when test="@required[.='Y']">
- <font color="red">
  <small>*</small>
  </font>
  </xsl:when>
  <xsl:otherwise> </xsl:otherwise>
  </xsl:choose>
  </td>
```

TABLE III-continued

```
- <td>
- <INPUT type="checkbox">
- <xsl:attribute name="name">
  <xsl:value-of select="htmlfieldname" />
  </xsl:attribute>
- <xsl:attribute name="id">
  yes_
  <xsl:value-of select="htmlfieldname" />
  </xsl:attribute>
- <xsl:attribute name="value">
- <xsl:choose>
  <xsl:when test="@subtype='1_0'">1</xsl:when>
  <xsl:when test="@subtype='T_F'">T</xsl:when>
  <xsl:when test="@subtype='Y_N'">Y</xsl:when>
  <xsl:when test="@subtype='YES_NO'">YES</xsl:when>
  <xsl:otherwise>TRUE</xsl:otherwise>
  </xsl:choose>
  </xsl:attribute>
  </INPUT>
  <LABEL>Yes</LABEL>
  </td>
  </tr>
  </xsl:otherwise>
  </xsl:choose>
  </xsl:template>
- <xsl:template match="field[@type='PICKLIST'][@subtype='RADIO']">
- <tr valign="top">
- <td>
  <xsl:value-of select="prompt" />
- <xsl:choose>
- <xsl:when test="@required[.='Y']">
- <font color="red">
  <small>*</small>
  </font>
  </xsl:when>
  <xsl:otherwise> </xsl:otherwise>
  </xsl:choose>
  </td>
- <td>
- <xsl:for-each select="picklist/item">
- <INPUT type="radio">
- <xsl:attribute name="name">
  <xsl:value-of select="../../htmlfieldname" />
  </xsl:attribute>
- <xsl:attribute name="value">
  <xsl:value-of select="value" />
  </xsl:attribute>
- <xsl:if test="(position( ) = ../../default)">
  <xsl:attribute name="checked">true</xsl:attribute>
  </xsl:if>
  </INPUT>
- <LABEL>
  <xsl:value-of select="prompt" />
  </LABEL>
  </xsl:for-each>
  </td>
  </tr>
  </xsl:template>
- <xsl:template match="field[@type='PICKLIST'][@subtype='DROPLIST']">
- <tr valign="top">
- <td>
  <xsl:value-of select="prompt" />
- <xsl:choose>
- <xsl:when test="@required[.='Y']">
- <font color="red">
  <small>*</small>
  </font>
  </xsl:when>
  <xsl:otherwise> </xsl:otherwise>
  </xsl:choose>
  </td>
- <td>
- <SELECT>
- <xsl:attribute name="name">
  <xsl:value-of select="htmlfieldname" />
  </xsl:attribute>
- <xsl:for-each select="./picklist/item">
- <OPTION>
- <xsl:attribute name="value">
  <xsl:value-of select="value" />
```

TABLE III-continued

```
</xsl:attribute>
<xsl:if test="(position( ) = ../../default)">
  <xsl:attribute name="selected">true</xsl:attribute>
</xsl:if>
<xsl:value-of select="prompt" />
</OPTION>
</xsl:for-each>
</SELECT>
</td>
</tr>
</xsl:template>
<xsl:template match="field[@type='PICKLIST'][@subtype='LISTBOX']">
<tr valign="top">
<td>
<xsl:value-of select="prompt" />
<xsl:choose>
<xsl:when test="@required[.='Y']">
<font color="red">
<small>*</small>
</font>
</xsl:when>
<xsl:otherwise> </xsl:otherwise>
</xsl:choose>
</td>
<td>
<SELECT>
<xsl:attribute name="name">
<xsl:value-of select="htmlfieldname" />
</xsl:attribute>
<xsl:attribute name="size">4</xsl:attribute>
<xsl:for-each select="./picklist/item">
<OPTION>
<xsl:attribute name="value">
<xsl:value-of select="value" />
</xsl:attribute>
<xsl:if test="(position( ) = ../../default)">
  <xsl:attribute name="selected">true</xsl:attribute>
</xsl:if>
<xsl:value-of select="prompt" />
</OPTION>
</xsl:for-each>
</SELECT>
</td>
</tr>
</xsl:template>
<xsl:template match="field[@type='PICKLIST'][@subtype='MULTI']">
<tr valign="top">
<td>
<xsl:value-of select="prompt" />
<!-- </td>
-->
<!-- <td align="center">
-->
<xsl:choose>
<xsl:when test="@required[.='Y']">
<font color="red">
<small>*</small>
</font>
</xsl:when>
<xsl:otherwise> </xsl:otherwise>
</xsl:choose>
</td>
<td>
<SELECT>
<xsl:attribute name="name">
<xsl:value-of select="htmlfieldname" />
</xsl:attribute>
<xsl:attribute name="MULTIPLE">true</xsl:attribute>
<xsl:attribute name="size">4</xsl:attribute>
<xsl:for-each select="./picklist/item">
<OPTION>
<xsl:attribute name="value">
<xsl:value-of select="value" />
</xsl:attribute>
<xsl:if test="(position( ) = ../../default)">
  <xsl:attribute name="selected">true</xsl:attribute>
</xsl:if>
<xsl:value-of select="prompt" />
</OPTION>
</xsl:for-each>
```

TABLE III-continued

```
</SELECT>
</td>
</tr>
</xsl:template>
</xsl:stylesheet>
```

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

What is claimed is:

1. A method, comprising:
receiving, at a client device, layout information that includes instructions for formatting of a plurality of variable data fields;
defining, by a layout engine executing at the client device, a variable data template document based on the layout information and including the plurality of variable data fields;
generating, by a web form definition module executing at the client device, a user interface window wherein the user interface window displays a list of the plurality of variable data fields of the variable data template document;
receiving, through the user interface window, user input specifying a type of each of the plurality of variable data fields and one or more properties of each of the plurality of variable data fields wherein the type is included among a plurality of field types selectable through the user interface window;
generating a preview of a web form based upon the user input received through the user interface window;
defining, at the client device, a web form definition file to include each variable data field from the plurality of variable data fields wherein the web form definition file is defined at the client device based at least in part upon the user input, the web form definition file including instructions to generate the web form, the web form configured to receive field content data;
defining, at the client device, a variable data design file that includes the variable data template document and the web form definition file; and
transmitting, from the client device to the publication server, the variable data design file such that the publication server (1) composes the web form configured to be displayed and to receive the field content data associated with the plurality of variable data fields, (2) composes a variable data document based on the variable data template document and the field content data.

2. The method of claim 1, wherein the user interface window includes a prompt field for receiving input specifying a prompt to be displayed in association with each variable data field from the plurality of variable data fields and wherein the one or more properties include at least one of a field visibility, whether a field of the web form is required to be completed when using the web form, and an order in which fields of the web form are to be displayed.

3. The method of claim 1, wherein the plurality of field types include at least a text field type and a yes/no selection type.

4. The method of claim 3, wherein the plurality of field types further include a pick list type and a gender selection type.

5. The method of claim 1, wherein the user input specifies a pattern which must be matched by data entered into a text field of the web form.

6. The method of claim 1, wherein the plurality of field types include a single line text field type and a multi-line text field type.

7. The method of claim 1, wherein the web form definition file is incorporated within the variable data design file in an extensible markup language (XML) format.

8. The method of claim 1, wherein the user interface is configured to receive input specifying a prompt associated with each of the plurality of variable data fields.

9. An apparatus, comprising:
a processor configured to execute a design module structured to include a layout engine and a web form definition module; and
the design module configured to be operatively coupled to a client device and a publication server, the design module configured to receive layout information that includes instructions for formatting of a plurality of variable data fields wherein the instructions are based upon user input received through a user interface window generated by the web form definition module, the user interface window displaying a list of the plurality of variable data fields of the variable data template document, the user input specifying a type of each of the plurality of variable data fields and one or more properties of each of the plurality of variable data fields wherein the type is included among a plurality of field types selectable through the user interface window;
the design module configured to define a variable data template document based on the layout information and including the plurality of variable data fields,
the web form definition module of the design module being configured to generate a preview of a web form based upon the user input received through the user interface window and to define a web form definition file that includes each variable data field from the plurality of data fields from the plurality of variable data fields wherein the web form definition file is defined at the client device based at least in part upon the user input, the web form definition file including instructions to generate a web form, the web form configured to receive field content data, the design module configured to define a variable data design file that includes the variable data template document and the web form definition file, the design module configured to transmit, to the publication server, the variable data design file such that the publication server (1) composes the web form configured to be displayed and to receive the field content data associated with the plurality of variable data fields, (2) composes a variable data document based on the variable data template document and the field content data.

10. The apparatus of claim 9, wherein the web form definition file specifies a prompt to be displayed in association with each variable data field from the plurality of variable data fields and wherein the one or more properties include at least one of a field visibility, whether a field of the web form is required to be completed when using the web form, and an order in which fields of the web form are to be displayed.

11. The apparatus of claim 9, wherein the plurality of field types include at least a text field type and a yes/no selection type.

12. The apparatus of claim 11, wherein the plurality of field types further include a pick list type and a gender selection type.

13. The apparatus of claim 9, wherein the user input specifies a pattern which must be matched by data entered into a text field of the web form.

14. The apparatus of claim 9, wherein the user interface is configured to receive input specifying a prompt associated with each of the plurality of variable data fields.

15. An apparatus, comprising:
a publication server configured to be operatively coupled to a first client device and a second client device, the publication server configured to receive, from the first client device, a variable data design file that includes (1) a variable data template document and (2) a web form definition file, the variable data template document having been defined by the first client device based on layout information that includes instructions for formatting of a plurality of variable data fields wherein the instructions are based upon user input received through a user interface window generated by variable data document design program, the user interface window displaying a list of the plurality of variable data fields of the variable data template document, the user input specifying a type of each of the plurality of variable data fields and one or more properties of each of the plurality of variable data fields wherein the type is included among a plurality of field types selectable through the user interface window, the web form definition file having been defined at the first client device (i) from the variable data template document by the first client device to include each data field from the plurality of data fields, and (ii) at least in part based upon the user input, the web form definition file including instructions to generate a web form, the web form configured to receive field content data and being previewed at the first client device based upon the user input, the publication server configured to extract the web form definition file from the variable data design file and convert the web form definition file into the web form, the web form including each variable data field from the plurality of variable data fields, the publication service configured to receive, from the second client device the field content data associated with the plurality of variable data fields, the publication server configured to composes a variable data document based on the variable data template document and the field content data.

16. The apparatus of claim 15, wherein the publication server is configured to send a signal indicative of a preview of the variable data document.

17. The apparatus of claim 15, wherein the plurality of field types include a single line text field type and a multi-line text field type.

18. The apparatus of claim 17, wherein the plurality of field types further include a pick list type and a gender selection type.

19. The apparatus of claim 15, wherein the publication server is configured to rasterize the variable data document.

20. The apparatus of claim 15, wherein the one or more properties include at least one of a field visibility, whether a field of the web form is required to be completed when using the web form, and an order in which fields of the web form are to be displayed.

21. A non-transitory processor-readable medium storing code representing instructions that when executed cause a processor to:
receive layout information that includes instructions for formatting of a plurality of variable data fields;
define a variable data template document based on the layout information and including the plurality of variable data fields;
generate, by a Web form definition module executing at the client device, a user interface window wherein the user interface window displays a list of the plurality of variable data fields of the variable data template document;
receive, through the user interface window, user input specifying a type of each of the plurality of variable data fields and one or more properties of each of the plurality of variable data fields wherein the type is included among a plurality of field types selectable through the user interface window;
generate a preview of a web form based upon the user input received through the user interface window;
define, from the variable data template document, a web form definition file that includes each variable data field from the plurality of variable data fields wherein the web form definition file is defined at the client device based at least in part upon the user input, the web form definition file including instructions to generate a web form, the web form configured to receive field content data;
define a variable data design file that includes the variable data template document and the web form definition file; and
transmit, to the publication server, the variable data design file such that the publication server (1) composes the web form configured to be displayed and to receive the field content data associated with the plurality of variable data fields, (2) composes a variable data document based on the variable data template document and the field content data.

22. The non-transitory processor-readable medium storing code of claim 21, wherein the one or more properties include at least one of a field visibility, whether a field of the web form is required to be completed when using the web form, and an order in which fields of the web form are to be displayed.

23. The non-transitory processor-readable medium storing code of claim 21, wherein the plurality of field types include at least a text field type and a yes/no selection type.

24. The non-transitory processor-readable medium storing code of claim 23, wherein the plurality of field types further include a pick list type and a gender selection type.

25. The non-transitory processor-readable medium storing code of claim 21, wherein the user input file specifies a pattern which must be matched by data entered into a text field of the web form.

26. The non-transitory processor-readable medium storing code of claim 21, wherein the user interface is configured to receive input specifying a prompt associated with each selectable option of a pick list on the Web form.

* * * * *